United States Patent [19]

Lewis

[11] 4,411,434

[45] Oct. 25, 1983

[54] FLUID SEALING ASSEMBLY FOR A MARINE RISER TELESCOPIC SLIP JOINT

[75] Inventor: George E. Lewis, Los Angeles, Calif.

[73] Assignee: Hydril Company, Los Angeles, Calif.

[21] Appl. No.: 381,009

[22] Filed: May 24, 1982

[51] Int. Cl.³ .................... F16J 15/48; F16L 17/00
[52] U.S. Cl. .................................. 277/27; 277/59;
285/96; 285/106; 285/141
[58] Field of Search ............... 277/3, 27, 59, 70, 71,
277/72 R, 73, 79, 30, 31; 285/96, 99, 100,
104–106, 113, 141, 147

[56] References Cited

U.S. PATENT DOCUMENTS

| | | | |
|---|---|---|---|
| 2,313,169 | 3/1943 | Penick et al. | 285/147 |
| 2,504,936 | 4/1950 | Payne | 285/96 X |
| 2,582,518 | 1/1952 | Works | 285/96 |
| 2,856,249 | 10/1958 | Leman | 277/59 X |
| 3,434,728 | 3/1969 | Soldato | 277/59 |
| 3,438,654 | 4/1969 | Jackson et al. | 285/141 |
| 3,598,429 | 6/1971 | Arnold | 285/96 X |
| 3,647,245 | 3/1972 | Hanes et al. | 285/106 |
| 3,711,123 | 1/1973 | Arnold | 285/96 X |
| 3,713,204 | 1/1973 | Arnold | 285/96 X |
| 3,713,675 | 1/1973 | White | 285/96 X |
| 3,724,879 | 4/1973 | Snyder | 285/113 X |
| 3,986,728 | 10/1976 | Marsh | 285/96 X |
| 4,078,832 | 3/1978 | Wittman | 285/96 X |

Primary Examiner—Robert S. Ward
Attorney, Agent, or Firm—Dodge & Bush

[57] ABSTRACT

A fluid sealing apparatus for use on telescopic slip joints of marine risers. A sealed housing is secured to one of the two telescopic members of the slip joint in a concentric surrounding relationship to the other tubular members with an annular recess disposed adjacent thereto. Positioned within the annular recess is one or more resiliently deformable packing elements operably deformed by sliding movement of an associated fluid pressure responsive packing follower. The packing follower is movable within the recess toward a central guide bushing for urging the packing disposed therebetween to be radially inwardly deformed for initially establishing and maintaining the desired fluid leakage blocking seal. The packing follower forms an enclosed annular expansible chamber within the sealing housing in order that a preselected quantity of hydraulic fluid introduced within the enclosed chamber will move the packing follower sufficiently to establish the initial or reference urging on the packing for operably deforming the packing sufficiently to effect and maintain the initial seal. The packing follower is also exposed to the pressure contained within the marine riser for feeding additional packing radially inwardly as the working pressure of the contained fluid increases and the packing wears. To enhance the useful operating life of the resilient packing a central movement guide bushing is preferably disposed between the companion sealing elements.

5 Claims, 2 Drawing Figures

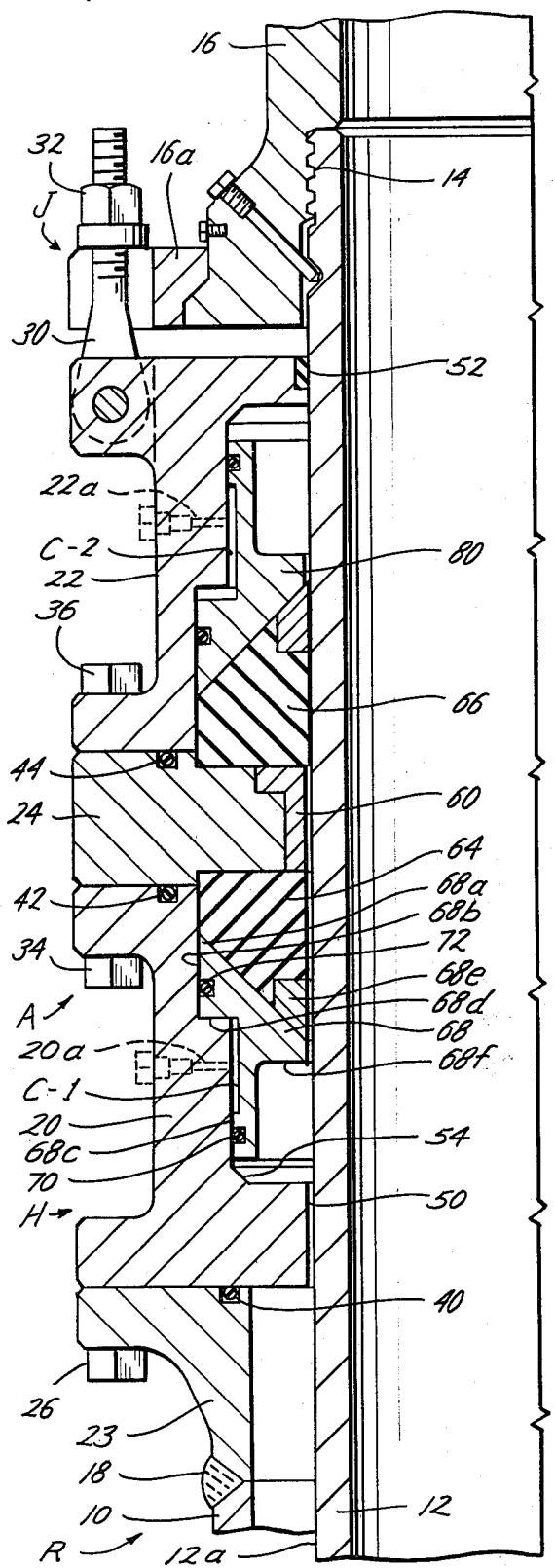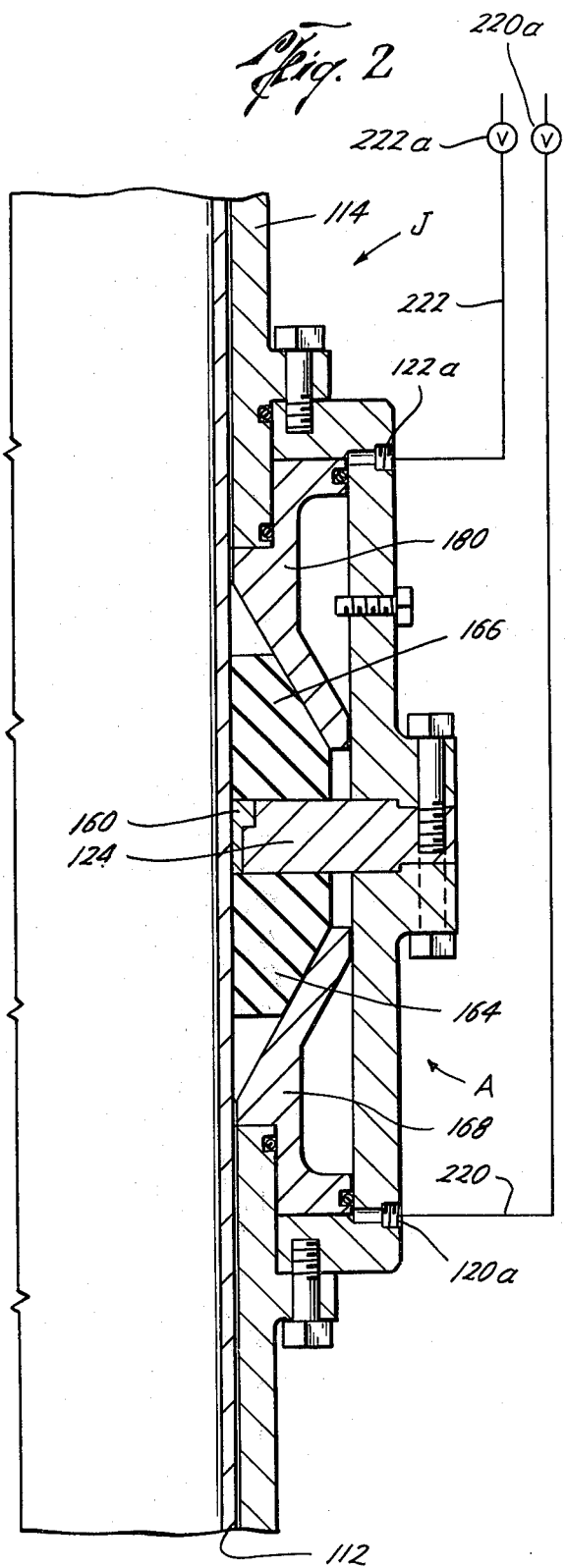

FLUID SEALING ASSEMBLY FOR A MARINE RISER TELESCOPIC SLIP JOINT

BACKGROUND OF THE INVENTION

This invention relates to the field of sliding fluid seals and more specifically to a fluid sealing assembly for use in sealing the contained fluid flow path of telescopic slip joints used in marine risers.

DESCRIPTION OF THE PRIOR ART

The use of length compensating telescopic slip joints in marine risers used to form an internal pressure containing flow passage for communicating a subsea wellhead and a floating marine vessel is known in the prior art. The telescopic slip joint dynamically compensates the effective operating length of the marine riser for actual distance changes resulting from the heave or other movement of the floating drilling or production vessel relative to the fixed submerged wellhead. The marine riser telescopic slip joint requires a sliding fluid seal between the relatively sliding inner and outer barrels or tubular members to prevent leakage or escape of working fluid from the riser between the relatively movable members.

Telescopic slip joint seal dynamic assemblies or packing elements have conventionally been radially split to facilitate rapid in-place seal assembly and maintenance operations such as packing removal and replacement while the marine riser essentially remains fully assembled. This radial packing split formed a channel or passageway that was a chronic source of undesired fluid leakage in the ring-like or torus-shaped resiliently deformable packing elements which were by their nature operably placed in direct contact with the working fluids. The resilient packing was deformed to effect a suitable operating seal by manually adjusting a packing follower during initial installation while providing a slight fluid leakage to lubricate and cool the packing. When excessive undesired fluid leakage commenced, it was necessary to again manually adjust or tighten the packing follower to further deform the packing to reestablish the proper seal.

SUMMARY OF THE INVENTION

The present invention relates to a new and improved fluid sealing assembly or apparatus that is especially well suited for use in sealing a telescopic slip joint used in marine risers. Such telescopic joints have relatively slidable inner and outer tubular barrel members which form a portion of the marine riser contained flow path. A dynamic seal assembly blocks undesired leakage of fluid between the relative movable tubular members to prevent escape or leakage of well fluids from the riser flow path. The present sealing assembly achieves a longer useful service life because of the extensive feedable or seal wear compensating supply of deformable packing coupled with the controlled packing feed or deformation by the fluid pressure responsive packing follower coupled with a replaceable guide bushing for the movable barrels. The sealing apparatus comprises a housing adapted to be secured to one tubular barrel member having an annular recess mounting a plurality of operably associated deformable annular packing and fluid responsive packing followers for controllably deforming the packing in a desired manner. The housing and packing followers form a sealed cavity or enclosed expansible chamber therebetween which, when filled with a predetermined quantity of incompressible fluid, displaces the packing followers to feed and deform the packing properly for forming the effective fluid seal between the inner and outer tubular members barrels. By controlling the quantity of the incompressible actuation fluid urging on the packing deforming follower an adjustable feed of the resilient packing is provided which prevents opening or other formation of leakage channels in the radial splits of the packing and which extend useful life of the seal packing.

BRIEF DESCRIPTION OF THE DRAWINGS

FIG. 1 is a side view in section of one embodiment of the seal apparatus of the present invention operably installed in a marine riser telescopic slip joint; and FIG. 2 is a side view in section of a second embodiment of the fluid sealing apparatus of the present invention similarly installed.

DESCRIPTION OF THE PREFERRED EMBODIMENT

A first embodiment of the fluid sealing apparatus, generally designated A of the present invention, is illustrated in FIG. 1. Preferably, the fluid sealing apparatus A of the present invention is utilized in a telescopic slip joint J mounted in a marine riser generally designated R. The marine riser R normally forms a low pressure containing fluid flow passage for communicating a fixed subsea wellhead (not illustrated) and a floating marine vessel (not illustrated) as is well known in the art. The telescopic slip joint, generally designated J, compensates the effective operating length of the marine riser R for the actual distance or length change of the marine riser R resulting from the heave or other movement of the floating vessel relative to the fixed submerged wellhead. The fluid sealing apparatus A of the present invention provides a dynamic seal for containing the fluid pressure within the marine riser R to prevent leakage or escape of working fluid from the riser R between the relative slidable or telescopic portions of the slip joint J as will be explained in greater detail hereinafter.

The slip joint J includes a tubular outer barrel portion or member 10 that is telescopically movable relative to an overlapping tubular inner member or barrel portion 12. The inner tubular member 12 is concentrically disposed within the outer tubular member 10 and in the illustrated embodiment is secured by threads 14 to an upper tubular riser portion 16 which communicates with the floating marine vessel. The lower outer tubular member 10 communicates with the riser and wellhead in the conventional manner.

The fluid sealing apparatus A of the present invention serves to provide a fluid retaining dynamic seal between the outer tubular member 10 and the inner tubular member 12 of the slip joint J in the usual manner. The fluid sealing apparatus A includes a seal housing H adapted to be secured with the outer tubular member 10 by suitable means such as a weld neck housing attachment flange 23 mounted by circumferential welding at 18. For ease of assembly and to facilitate seal maintenance operations, the housing H is formed by a pair of tubular sections 20 and 22 having a ring-shaped section 24 releasably secured therebetween. The lower housing section 20 is releasably secured to the housing attachment flange 23 by suitable conventional means such as a plurality of circumferentially spaced hexagonal head bolts 26. For shipping and handling purposes of the slip joint J, latching or securing bolts 30 are pivotally attached to the upper housing member 22 to enable securing to a retaining flange 16a attached to the upper riser portion 16 by thread engaging nuts 32. When the securing nuts 32 are released from the flange 16a, the bolts 30 are pivoted outwardly from engagement with the flange 16a and the inner and outer tubular members 12 and 10, are then enabled to move longitudinally telescopically relative to each other.

A circumferentially spaced plurality of hex head bolting 34 secures the center housing ring 24 to the lower housing section 20 while the upper housing section 22 is secured to the ring 24 by a similar arrangement provided by a similar plurality of bolting 36. By forming the housing in such easily disassembled sections, access to the replaceable parts of the fluid seal apparatus A with a minimum of effort and lost drilling time is provided.

The housing attachment flange 23 carries an O-ring 40 to prevent any undesired leakage of fluid between the attachment flange 23 and the lower housing section 20. A similar O-ring 42 prevents such leakage of fluid between the lower housing section 20 and the center housing ring 24. The center ring 24 also carries an O-ring 44 for sealing with the upper housing section 22 in a similar manner to complete the housing H seal integrity.

The tubular housing H forms an inner cylindrical surface 50 that is disposed adjacent to and slightly spaced concentrically outwardly from the outer cylindrical surface 12a of the inner tubular member 12. A suitable wiper 52 is carried on the inner surface 50 by the upper housing section 22 to exclude undesirable foreign matter from entering the seal housing H and damaging the seal apparatus A in the usual manner. The inner surface 50 of the housing H forms a seal carrying annular recess, generally designated 54, that is also disposed adjacent to and concentrically surrounding the outer cylindrical surface 12a of the inner tubular member 12. Releasably secured to the central ring member 24 of the housing H is a movement guide bushing 60 which may be formed in segments for installation purposes. The replaceable guide bushing 60 surrounds the inner tubular member 12 and enables the longitudinal sliding or telescopic movement of the tubular members 10 and 12 in the conventional manner while preventing or limiting radial misalignment or eccentric relative positioning therebetween during such sliding movement. The exposed housing bolting 34 and 36 facilitates rapid replacement of the guide bushing 60 as needed as well as replacement of the resiliently deformable packing or seal elements 64 and 66 which are disposed immediately below and above the guide bushing 60, respectively. The lower resiliently deformable packing 64 effects a desired fluid seal between the housing section 20 and the tubular member 12 below the guide bushing 60 while the upper packing 66 establishes a substantially similar fluid seal immediately above the guide bushing 60. The packing material may be of any suitable material compatible with the particular drilling fluid used in the marine riser.

Also disposed in the recess 54 immediately below and in contact with the lower packing 64 is a lower packing follower 68. The packing follower 68 is slidably movable in the annular recess 54 from the illustrated position of FIG. 1 toward the guide bushing 60 for urging the associated lower packing 64 to feed radially inward and thereby also resiliently deform for effecting the desired sliding seal with the inner tubular member 12.

The tubular lower packing follower 68 forms an outer surface 68a adjacent the lower housing portion 20 and having a first cylindrical or constant diameter portion 68b and a second constant diameter outer portion 68c. The constant diameter portion 68b is located nearer the associated packing 64 and is formed on a greater diameter than the constant diameter portion 68c to provide a downwardly facing pressure responsive annular shoulder or surface referenced as 68d. Suitable fluid seals provided by O-rings 70 and 72 carried by the sliding follower 68 seal the constant diameter portions 68c and 68b, respectively, to the tubular housing section 20 for forming an enclosed expansible annular chamber referenced as C-1. The housing section 20 is provided with suitable threaded inlet port 20a having an inlet check valve or one-way fitting to enable the selected introduction of a desired quantity of suitable incompressible hydraulic fluid into the annular expansible chamber C-1 for urging on the shoulder 68d to move the follower 68 to slide toward the guide bushing 60 and feed the seal 64 radially inwardly establishing a reference or initial seal actuating urging to operably deform the seal element 64. A seal retaining lip or backup ring 68e may be provided in the follower 68 to aid in operably feeding the seal 64.

An upper packing follower 80 is disposed adjacent the upper packing 66 for feeding and resiliently deforming the upper packing 66 in response to the initial urging from fluid in enclosed annular chamber C-2 introduced through a check valve inlet port 22a. As the upper follower 80 is sealed in the manner substantially identical to the lower follower 68 to form chamber C-2 but positioned facing in an opposite direction, it need not be described in detail again as reference may be had to the previous written disclosure of the lower follower 68 for its operation. In some instances, the weight of the upper packing follower 66 may be sufficient to establish and maintain the proper upper seal 66. Normally, the controlled introduction of hydraulic fluid, such as grease or the like, into the sealed annular expansible chambers C-1 and C-2 will predetermine the initial urging movement of the respective packing followers 68 and 80 towards the central guide bushing 60 for resiliently deforming the associated packings 64 and 66 to form the initial seals.

The downwardly facing portion of the lower packing follower 68 between the seal of the lower O-ring 70 and the seal point or diameter between the resilient packing element 64 and the packing follower 68 also provides a downwardly facing pressure responsive shoulder referenced as 68f that is exposed to the pressure of the contained drilling or working fluid within the marine riser R. This working fluid pressure acting on shoulder 68f will automatically provide additional force for urging movement of the lower packing follower 68 toward the center guide bushing 60 for additionally feeding and deforming the packing 64 with the working fluid pressure to energize the seal 64. By tapering or otherwise shaping the packing engaging surfaces of the packing follower 64, the radial inward deformation of the packing 64 for effecting the desired seal can also be controlled and enhanced as the packing follower 64 is moved toward the guide bushing 60. In addition, the use of the packing followers 64 and 80 serve to eliminate or prevent the channelization or formation of fluid leakage paths along the radial splits of the packings 64 and 66 that are required for ease of installation.

FIG. 2 illustrates a second embodiment of fluid sealing apparatus A of the present invention that is substantially similar, if not identical, in both construction and operation of the embodiment of FIG. 1. To simplify the understanding of the written description of the embodiment of FIG. 2, the identical reference characters, increased by a factor of 100, have been utilized to designate like parts. Both the lower packing follower 168 and the upper packing follower 180 are urged toward the central guide bushing 160 for inwardly feeding and deforming the resilient deformable sealing rings or elements 164 or 166, respectively, in essentially the manner previously described. Hydraulic fluid is introduced in desired amounts through the inlet ports 120a and 122a to effect operating movement of the packing followers 168 and 180 and deform the associated packings 164 and 166, respectively, in the manner previously described. In addition, the contained working fluid pressure within the inner tubular member 112 is also exposed to the lower packing follower 168 which is also arranged to be responsive to the working fluid pressure for assisting its urging and feeding of the lower packing element 164 in the manner previously described. For certain working fluid sealing operations, the weight of the upper packing follower 180 may also be sufficient to actuate and feed the upper packing 166 to effect the desired initial seal.

In the embodiment of FIG. 2, the fluid pressure introduced through ports 120a and 122a is remotely and automatically introduced using external flow lines 220 and 222. Suitable control valving 220a and 222a is located in the flow lines 220 and 222, respectively, to control the fluid pressure therein which is communicated into the expansible chamber C-1 and C-2. The remote introduction of fluid pressure into the expansible chambers provides greater flexibility in locating the slip joint in the riser system while reducing the time to routinely service or adjust the packing. In addition, the automatic controls can be arranged to provide a resilience in the pressurizing fluid to compensate for packing wear or temperature changes as well as venting the system to reduce the pack-off tightness. The automatic and remote control arrangement of FIG. 2 can also be employed with the same advantages in the embodiment illustrated in FIG. 1.

USE AND OPERATION OF THE PRESENT INVENTION

The use and operation of both illustrated embodiments of the present invention is essentially the same, if not identical as previously noted. Both slip joints J are assembled in the manner illustrated with the packing in the relaxed condition illustrated and with the tubular members 10 or 12 secured against longitudinal operating movement by nuts 32. When installed in a marine riser the tubular members 10 and 12 are first released for enabling operating telescopic movement of the slip joint J. Predetermined quantities of a hydraulic fluid are then introduced or forced into either or both of the enclosed expansible chambers C-1 or C-2 for effecting sufficient initial movement of the packing followers 68 and 80 to deform the associated packing sufficiently to effect the initial seal. The marine riser is then utilized to form the desired working fluid flow path.

As the pressure of the working fluid contained in the slip joint J increases, its urging of the lower packing follower 68 for moving the lower follower 68 toward the packing 64 also increases. The working fluid pressure thus serves to help both feed the lower packing radially inwardly and to increase the sealing contact pressure to insure proper seal operation. In addition, the continuous urging of the packing followers on both the packings 64 and 66 prevents formation of leakage paths or channels through the radial splits in the packing.

As the packing wears, it may be necessary periodically to increase the quantity of hydraulic fluid in the enclosed chamber to feed and maintain fresh packing into sealing contact with the other tubular member. When the reservoir of feedable packing is essentially consume or used up, it will become necessary to replace the packings 64 and 66 and guide bushing 60 if worn. This may be accomplished without disturbing the remainder of the marine riser due to the bolted construction of the housing H.

The foregoing disclosure and description of the invention are illustrative and explanatory thereof, and various changes in the size and shape, as well as in the materials thereof, may be made without departing from the spirit of the invention.

I claim:
1. A fluid sealing apparatus adapted for use in a slip joint of a marine riser, the slip joint having relative reciprocating inner and outer tubular members which form a portion of the contained fluid flow path provided by the marine riser and which telescopically move relative to the other member to compensate for variations in effective riser length, said fluid sealing apparatus, including:
   a seal housing adapted to be secured to one of the tubular members for operably positioning said seal housing relative to the other of the tubular members, said housing have an annular recess disposed adjacent the other of the tubular members;
   a resiliently deformable packing disposed in said annular recess for forming a desired fluid seal between said seal housing and the other of the tubular members to prevent undesired leakage of fluid therebetween;
   a packing follower movably disposed in said annular recess for urging said packing to operably deform to effect the desired fluid seal, said packing follower responsive to a prearranged fluid pressure urging thereon to urge said packing to operably deform for effecting the desired seal;
   said seal housing concentrically surrounding the other tubular members for enabling relative movement therebetween when secured and to one of the tubular members to juxtapose said annular recess and the other tubular member;
   said packing follower having substantially a sleeve shape for positioning in said annular recess while concentrically surrounding the other tubular member, said packing follower slidably disposed in said annular recess for movement to operably deform said packing;
   said sleeve-shaped packing follower having an outer surface formed by a first constant diameter portion and a second constant diameter portion, said first diameter portion having a greater diameter than said second diameter portion;
   a first seal means for slidably sealing said first constant diameter portion to said seal housing; and
   second seal means for slidably sealing said second constant diameter portion to said seal housing, said first seal means and said second seal means partially defining an enclosed expansible chamber for urging said packing follower to operably deform said packing in response to the fluid pressure in said enclosed expansible chamber.

2. The fluid sealing apparatus as set forth in claim 1, wherein:

said sleeve-shaped packing follower responsive to the fluid pressure contained in the marine riser for urging said packing follower to operably deform said packing in response to the fluid pressure in the marine riser.

3. A fluid sealing apparatus adapted for use in a slip joint of a marine riser, the slip joint having inner and outer tubular members which form a portion of the contained fluid flow path provided by the marine riser and which telescopically move to the other member to compensate for variations in effective riser length, said fluid sealing apparatus including:

a seal housing adapted to be secured to one of the tubular members for operably positioning said seal housing relative to the other of the tubular members, said housing having an inner cylindrical surface forming an annular recess disposed adjacent the other of the tubular members;

a guide bushing releasably secured in said annular recess, said guide bushing having a cylindrical inner surface surrounding a cylindrical outer portion of the other tubular member for enabling and guiding sliding telescopic movement therebetween while maintaining a substantially concentric relationship;

a pair of resiliently deformable packings disposed in said annular recess, each of said packings forming a desired fluid seal between said seal housing and the other of the tubular members to prevent undesired leakage of fluid therebetween said guide bushing position between said packings;

each packing having a packing follower movably disposed in said annular recess for urging each of said packings toward said guide bushing to operably deform said packing to effect the desired fluid seal, said packing follower responsive to a prearranged fluid pressure urging thereon to urge said packing to operably deform for effecting the desired seal;

each said packing follower sealed to said seal housing to form an enclosed expansible chamber, each said packing follower having a first pressure responsive surface exposed to the fluid pressure in said enclosed expansible chamber for urging said packing follower toward said guide bushing to deform said packing in response to the fluid pressure in said enclosed expansible chamber for urging said packing follower toward said guide bushing to deform said packing in response to the fluid pressure in said enclosed chamber;

means formed in said housing for enabling introduction of a controlled amount of fluid into said enclosed expansible chamber to provide a predetermined urging on said packing follower toward said guide bushing to deform said packing sufficiently to establish a seal;

one of said packing followers having a second pressure responsive surface exposed to the fluid pressure contained within the marine riser for urging said packing follower toward said guide bushing to deform said packing in response to the fluid pressure in the marine riser wherein the fluid pressure urging on said first and said second pressure responsive surfaces of each packing follower urge said follower toward said guide bushing to deform said packing to maintain the desired seal;

each said packing follower having an outer surface formed by a first constant diameter portion and a second constant diameter portion, said first diameter portion having a greater diameter than said second diameter portion;

a first seal means for slidably sealing said first constant diameter portion to said seal housing; and second seal means for slidably sealing said second constant diameter portion to said seal housing, said first seal means and said second seal means forming said first pressure responsive surface and partially forming said enclosed chamber for urging on said packing follower to operably deform said packing in response to the fluid pressure in said enclosed expansible chamber.

4. A fluid sealing apparatus adapted for use in a slip joint of a marine riser, the slip joint having inner and outer tubular members which form a portion of the contained fluid flow path provided by the marine riser and which telescopically move relative to the other member to compensate for variations in effective riser length, said fluid sealing apparatus including:

a seal housing adapted to be secured to one of the tubular members for operably positioning said seal housing relative to the other of the tubular members, said housing having an inner cylindrical surface forming an annular recess disposed adjacent the other of the tubular members;

a guide bushing releasably secured in said annular recess, said guide bushing having a cylindrical inner surface surrounding a cylindrical outer portion of the other tubular member for enabling and guiding sliding telescopic movement therebetween while maintaining a substantially concentric relationship;

a resiliently deformable packing disposed in said annular chamber adjacent said guide bushing for forming a desired fluid seal between said seal housing and the other of the tubular members to prevent undesired leakage of fluid therebetween;

a packing follower movably disposed in said annular chamber for urging said packing toward said guide bushing to operably deform said packing to effect the desired fluid seal, said packing follower responsive to a prearranged fluid pressure urging thereon to urge said packing to operably deform for effecting the desired seal;

said packing follower having an outer surface formed by a first constant diameter portion and a second constant diameter portion; said first diameter portion having a greater diameter than said second diameter portion;

a first seal means for slidably sealing said first constant diameter portion to said seal housing; and second seal means for slidably sealing said second constant diameter portion to said seal housing, said first seal means and said second seal means partially defining an enclosed expansible chamber for urging said packing follower to operably deform said packing in response to the fluid pressure in said enclosed expansible chamber.

5. The fluid sealing apparatus as set forth in claim 4, wherein:

said packing follower responsive to the fluid pressure contained in the marine riser for urging said packing follower to operably deform said packing in response to the fluid pressure in the marine riser.

* * * * *